United States Patent
Steins et al.

(10) Patent No.: US 7,698,056 B2
(45) Date of Patent: Apr. 13, 2010

(54) METHOD FOR THE INPUT DATA INTO A VEHICLE NAVIGATION DEVICE

(75) Inventors: Wilfried Steins, Ismaning (DE); Bernd Biechele, Munich (DE); Thomas Piasecki, Garching (DE); Andrea Holz, Munich (DE); Marcello Tava, Munich (DE); Werner Richter, Unterhaching (DE); Andreas Dirschl, Reichertshausen (DE); Uwe Koch, Vaterstetten (DE); Christian Juretzko, Mering (DE); Eva Kroll, Munich (DE); Roman Berger, Munich (DE); Michael Vagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 195 days.

(21) Appl. No.: 11/675,960

(22) Filed: Feb. 16, 2007

(65) Prior Publication Data
US 2007/0198171 A1 Aug. 23, 2007

(30) Foreign Application Priority Data
Feb. 22, 2006 (DE) ........................ 10 2006 008 221

(51) Int. Cl.
*G01C 21/00* (2006.01)
(52) U.S. Cl. ...................... 701/200; 701/207; 701/208
(58) Field of Classification Search ............. 701/200, 701/207, 208
See application file for complete search history.

(56) References Cited

U.S. PATENT DOCUMENTS

| 7,239,961 | B2 * | 7/2007 | Banet et al. .................. 701/208 |
| 2003/0093504 | A1 * | 5/2003 | Neunhoeffer et al. ....... 709/220 |
| 2003/0100976 | A1 * | 5/2003 | Watanabe et al. .............. 701/1 |
| 2004/0204844 | A1 | 10/2004 | Xu |
| 2004/0229598 | A1 * | 11/2004 | Tajima et al. ............ 455/414.1 |
| 2005/0149260 | A1 * | 7/2005 | Bae ............................ 701/209 |

FOREIGN PATENT DOCUMENTS

| DE | 298 12 320 U1 | 12/1998 |
| DE | 199 27 647 A1 | 12/2000 |
| DE | 100 57 800 A1 | 6/2002 |
| DE | 101 34 108 A1 | 1/2003 |
| DE | 103 02 677 A1 | 7/2004 |

OTHER PUBLICATIONS

German Search Report dated May 9, 2006, including an English translation of the relevant portion (Nine (9) pages).

* cited by examiner

*Primary Examiner*—Khoi Tran
*Assistant Examiner*—Nikhil Sriraman
(74) *Attorney, Agent, or Firm*—Crowell & Moring LLP

(57) ABSTRACT

In the case of a method for the input of input data into a vehicle navigation device, by which input data are supplied to the vehicle navigation device by way of a receive interface and the input data are subjected to a plausibility check, in the event of a negative plausibility check, a prompt is emitted for correcting the input data. The input data can be corrected by a user via an operating device, and the corrected input data are imported into the vehicle navigation device.

17 Claims, 1 Drawing Sheet

METHOD FOR THE INPUT DATA INTO A VEHICLE NAVIGATION DEVICE

BACKGROUND AND SUMMARY OF THE INVENTION

This application claims the priority of German Application No. 10 2006 008 221.4, filed Feb. 22, 2006, the disclosure of which is expressly incorporated by reference herein.

The invention relates to a method for the input of input data into a vehicle navigation device, by which input data are supplied to the vehicle navigation device via a receive interface and the input data are subjected to a plausibility check.

Currently, mobile CE terminals (mobile telephones, Smart phones, PDAs, etc.) frequently have databanks in which addresses can be stored, for example, in the vcard format. In order to bypass the time-consuming procedure of inputting a destination into the navigation system of a motor vehicle, methods are known which permit the reading of addresses from the address books of the CE terminals into the navigation system by way of suitable data transmission techniques (such a Bluetooth). As a rule, only input data are to be imported in this case, which input data are compatible with a databank of the navigation system or plausible with respect to comparison data stored in the databank. Thus, when address data are supplied, it can, for example, be ensured that the supplied address is indicated in the map material of the navigation system or can be found geographically.

A method of the above-mentioned type is known, for example, from German Patent document DE 199 27 647 A1. Despite the saving of time at least theoretically permitted by such methods when importing navigational destination data from the address book of a mobile device, problems frequently arise when such methods are used in practice. These problems occur when the data supplied by the address book are not compatible or plausible with respect to the databank of the navigation system. If, for example, a supplied address cannot be found in the databank of the navigation system, the plausibility check will have a negative result and the address cannot be imported as a navigation destination. German Patent document DE 199 27 647 A1 discloses no solution for handling input data for which the plausibility check supplies a negative result. Correspondingly, in the case of the known devices and methods, a manual input of the destination data is finally often still necessary. In the worst case, the user may not even notice that the importing of input data was not successful and the input data may be lost completely.

It is an object of the invention to provide a simple method by which the importing of supplied input data in the case of a negative plausibility check will be facilitated.

According to the invention, this object is achieved by a method for the input of input data into a vehicle navigation device, by which input data are supplied to the vehicle navigation device via a receive interface and the input data are subjected to a plausibility check. In the case of a negative plausibility check, a prompt is emitted for correcting the input data. The input data can then be corrected by a user by way of an operating device, and the corrected input data are then imported into the vehicle navigation device. Preferred embodiments or further developments of the invention are described and claimed herein.

According to the invention, in the event of a negative plausibility check, a prompt to correct the input data is emitted to a user, as a rule, typically the driver of the motor vehicle. The user is then provided with the possibility of correcting the input data by way of a suitable operating device. As a result, despite an initially negative plausibility check, the input data can still be imported in a corrected form into the vehicle navigation device.

The prompt for the correction preferably takes place by an explicit textual or symbolic flag. However, this may also take place implicitly by the stressing of data to be corrected. The prompt may also take place in an acoustically or haptically assisted manner, or only acoustically or haptically.

In principle, a correcting mechanism for correcting input data may operate in multiple fashions. Accordingly, the input data may be completely or only partially capable of being corrected by the user. Variants of the invention are preferred in the case of which the correction of the input data by the user can take place at very low expenditures, for example, with a very low number of user actions.

This can be achieved, in particular, when hierarchical data blocks are supplied, for example, by way of a hierarchically structured plausibility check. Thus, the plausibility of hierarchically higher-ranking data, that is, data situated at a hierarchically higher level, is checked first and, if the result of the plausibility check for the higher-ranking data is negative, the user is given the opportunity to correct the higher-ranking data. Only when the higher-ranking data are plausible after the correction has taken place, then the plausibility of the lower-ranking data is checked. If, for example, address data blocks of the structure 1."State", 2."Zip Code/City", 3."Street", 4."House Number/Intersection" are supplied to the navigation system, the plausibility check can take place such that first the plausibility of the contents of the here higher-ranking data field "State" is checked; then the plausibility of the contents of the data field "Zip Code/City" is checked; then the plausibility of the contents of the data field "Street" is checked; and only then the plausibility of the data field "House Number/Intersection" is checked.

If the computational capacity of the navigation system is sufficient, naturally a plausibility check of lower-ranking input data may also already be taking place before the higher-ranking input data have been corrected by the user. However, no reliable restriction of the comparison data can then take place with respect to those comparison data which can be assigned to the already checked higher-ranking data. The plausibility check of the lower-ranking data can, however, take place, for example, on the basis of similarities of the higher-ranking input data to certain comparison data or relative to all suitable comparison data of the databank.

During the prompt to correct the input data emitted according to the invention, it is preferably signaled to the user on which level the plausibility check had a negative result and a correction is required. The user is thereby permitted to carry out a targeted correction of the input data at the corresponding level, and the user does not have to input unnecessary corrections in the case of already previously plausible input data or again check (or confirm already successfully validated input data).

The free-text inputs in the address book of a mobile device, which, according to the invention, are supplied as input data to the navigation system, frequently deviate only minimally from the comparison data of the databank of the navigation system. Such slight deviations may result from typing mistakes or a slightly deviated spelling. Because of the frequency of such slight deviations, the correction mechanism provided according to the invention is preferably constructed such that the user essentially has to correct only the deviations of the input data from the comparison patterns of the databank.

During the prompt for correcting the input data emitted according to the invention, it is preferably signaled to the user precisely which deviations exist with respect to one or more of the comparison patterns similar to the input data. The deviations are marked for this purpose. This can, for example, take place in that individual letters, in which the input data deviate from an otherwise similar pattern, are visually stressed, for example, have a colored backing or are shown in a special font. The user can then check the input data in a targeted manner at the deviation points and can, as required, correct only the deviations. The user's correction expenditures are therefore particularly low.

In the case of correction mechanisms which are based on the fact that the user can input new characters at a location marked by a cursor, the targeted correction can be made easier for the user in that the cursor is placed at a deviating character.

The user may also be given the opportunity of selecting that comparison pattern (depending on the input mechanism, for example, by scrolling or touching), which in fact is to be imported into the navigation system from several comparison patterns that are similar to the deviating input data.

As an alternative or in addition to the present invention, an increase of the tolerance of the plausibility check can also be considered. Small deviations will then not necessarily result in a negative plausibility check. Only clear deviations require a correction. However, an excessively high tolerance is frequently undesirable because an increasing tolerance will raise the danger of misinterpretations.

Other objects, advantages and novel features of the present invention will become apparent from the following detailed description of the invention when considered in conjunction with the accompanying drawings.

DETAILED DESCRIPTION OF THE DRAWING

Figure 1:
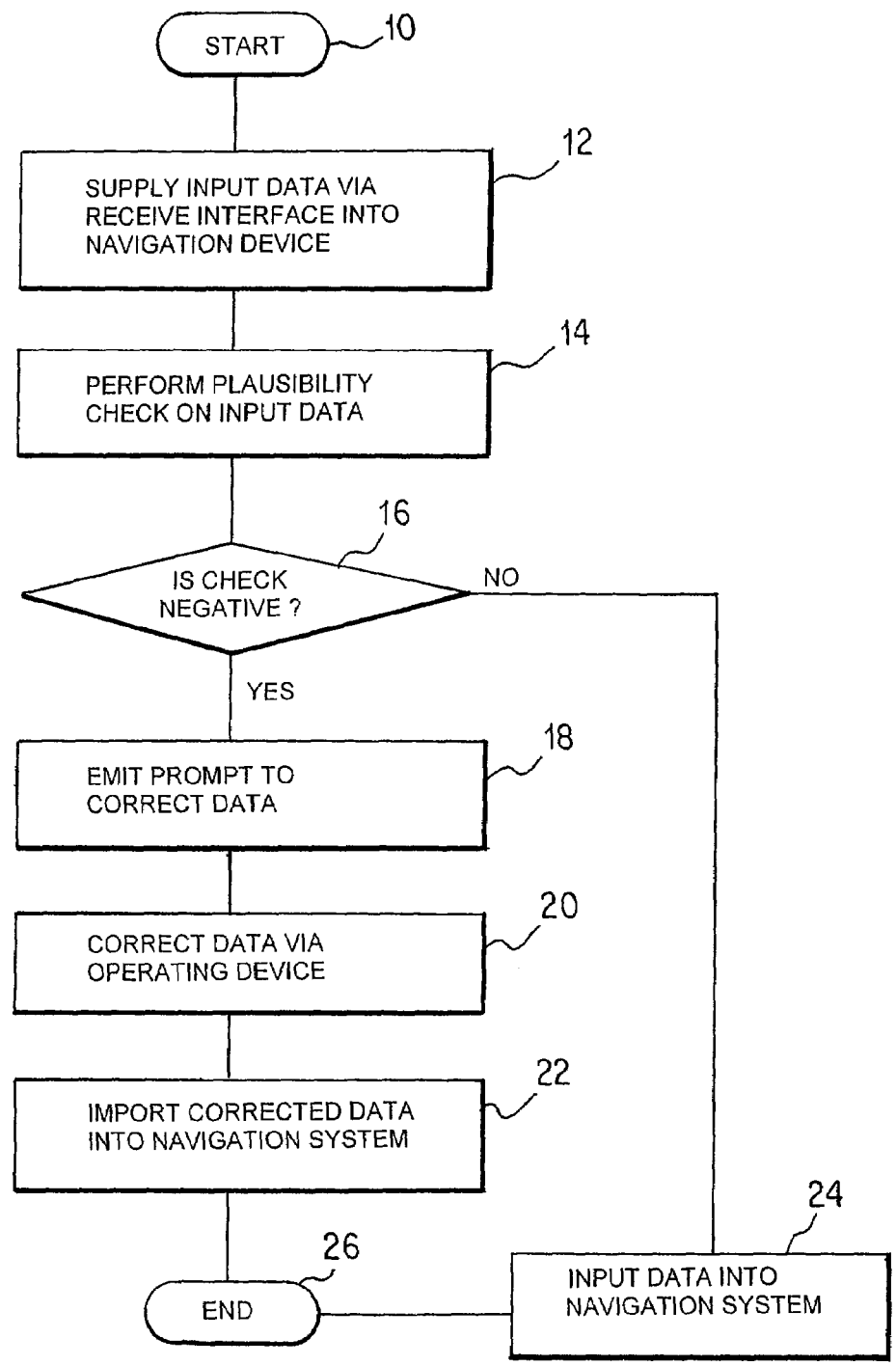
FIG. 1 is a flow chart illustrating, in general, the method according to the present invention.

Referring to the flow chart of FIG. 1, the method according to the present invention starts (step 10) by supplying input data via a receive interface to a vehicle navigation device (step 12). There, a plausibility check is performed on the supplied input data (step 14). If the plausibility check is positive (step 16), then the input data is imported into the navigation system (step 24) and the process ends (step 26). However, if the plausibility check is negative (step 16), a prompt is emitted to the user for correcting the input data (step 18). At that point, the user may then correct the input data by way of an operating device (step 20). The corrected input data is then imported into the navigation system (step 22) and the process ends (step 26).

In the following, a preferred embodiment of the invention will be described in detail by means of an example.

A PDA is connected with a navigation system of a motor vehicle by way of a Bluetooth connection. Address data from the address book of the PDA are supplied as input data to the navigation system via the Bluetooth connection. The PDA and the navigation system are always mutually compatible with respect to the data formats of the data to be supplied; that is, the supplied address data blocks can be read and processed by the navigation system.

At the navigation system, the address data blocks supplied by the Bluetooth connection are validated; that is, are subjected to a plausibility check. In this case, it is checked whether the respective address is contained in the databank of the navigation system. Only in this case will an arriving address data block be further processed in the navigation system; for example, will be imported into the address memory of the navigation system.

The arriving address data blocks include essentially four data fields:
1. State
2. Zip Code/City
3. Street
4. House Number or Intersection The navigation system compares the content of each data field in a decreasing hierarchical sequence 1,2,3,4 with the corresponding comparison data of the databank. The hierarchical sequence is used, for example, for limiting the quantity of the relevant comparison data in the individual validation steps. Thus, only those comparison data are taken into account which can be assigned to the already checked higher-ranking data. For example, only the city names of a certain state listed in the "State" data field should be used as a comparison pattern for the "City" data field.

If no, or no complete, validation of a supplied address data block is possible, the user is given the opportunity to correct the input data.

In this case, the validation and the correction take place in an interactive process between the user and the vehicle. Arranged below one another, the contents of the following four data fields are indicated to the user on a video screen of the navigation system next to an explicit or implicit prompt to make corrections:
1. State
2. Zip Code/City
3. Street
4. House Number or Intersection A not successfully validated data field, which therefore is to be corrected, is highlighted in color on the video screen for the user. Instead of a colored highlighting, multiple other highlighting variants are also contemplated, such as an inverted representation, a colored backing, a change of the font, a framing, etc.

Within the data block highlighted in color according to the preferred embodiment, additionally, those characters of the input data of the data field are stressed by bolding with respect to which the supplied input data of the input field deviate from a comparison pattern judged by a comparison algorithm used for the validation as being similar to the supplied input data of the input field.

For correcting the input data or the deviations, the user can choose between three fixedly or dynamically selectable operating modes:

(1) According to a first operating mode, a cursor for the input of characters is placed exactly at a character of the data field with respect to which the supplied input data of the input field deviate from a comparison pattern judged to be similar. The user can thereby correct the character at very low expenditures. After the correction, the check is again initiated for the validation. In the case of a correction of several characters, after each input of a character, the cursor can be placed at the next deviating character. The validation and/or determination of similar comparison patterns can also be initiated again after the input of each new character. However, the user may also be permitted to correct several characters in one step without a new validation and/or an automatic placing of the cursor.

(2) According to a second operating mode, the user can select a comparison pattern by scrolling between several comparison patterns judged to be similar, by which comparison pattern the content of the data field will then be replaced.

(3) According to a third operating mode, analogously to the purely manual input known from the state of the art, the user is assisted by the so-called "speller" which, after the validation or input of a chain of characteristics, indicates all selectable alternatives starting with this chain of characters. If required, this operating mode can also be refined in that the data field does not have to be completely filled out again but the input does not start before the first character, in which the content of the data field supplied by the PDA deviates from a comparison pattern judged to be similar.

Instead of the possibility of selecting between the operating modes provided in the present embodiment of the invention, according to other embodiments of the invention not described here in detail, an operating mode may also be firmly defined by the navigation system.

Only after a successful correction and a subsequent successful validation of a data field previously not successfully validated will the next data field be validated and, as necessary, corrected according to the above-mentioned decreasing hierarchical sequence.

Within the scope of the interactive correction mechanism, hierarchically lower-ranking fields can therefore not be processed until all higher-ranking fields have been successfully validated. One exception is the "Street" field, which can be filled in or corrected before the "City" field. For this purpose, the user can change from the "City" field into the "Street" field by means of a cursor. By means of a cursor, the user can return into a hierarchically higher data field at any time and make changes there. In the case of changes, a new plausibility check of the changed date field and subsequently of all hierarchically lower-ranking data fields is initiated.

The data fields are processed in the above-mentioned decreasing hierarchical sequence until finally a validated address is present. The latter is indicated to the user and the user can choose whether it is to be stored in the address memory of the navigation system or is to be rejected or whether a routing to the address is to be started immediately.

Successfully validated data fields are not visually highlighted. No cursor is placed there either. If, for example, an address data block is supplied whose "State" and "City" data fields are immediately successfully validated, but whose "Street" data field was at first not successfully validated, the correction dialogue starts directly from the user's viewpoint with the highlighting of the "Street" data field. The user therefore does not have to concern himself in any way with the successfully validated "State" and "City" data fields. If that is what he wants to do, he can, however, check them because their contents are also visible on the video screen.

If, on the other hand, an address data block is supplied to the navigations system for which all data fields are immediately validated successfully, the address is indicated to the user only for confirmation purposes, and it is made possible for him to store the address in the address memory, to reject it, or to immediately start a routing to the address.

According to alternative embodiments of the invention not described here in detail, the confirmation step may also be omitted for all successfully validated data blocks or for all data blocks successfully validated without a correction. As a result, a large number of supplied data blocks way be rapidly imported successively into the address memory of the navigation system. The import will then only be interrupted for corrections to be carried out according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for inputting input data into a vehicle navigation device, by which the input data are supplied to the vehicle navigation device via a receive interface and the input data are subjected to a plausibility check, the method comprising the acts of:

performing the plausibility check on hierarchically higher-ranking data of hierarchically structured address data block;

in an event of a negative plausibility check, emitting a first prompt to a user for correcting the input data before the plausibility of hierarchically lower-ranking data of the address data block is checked;

based on the first prompt, correcting the input data by the user via an operating device; and importing the corrected input data into the vehicle navigation device;

following said the correction input data, checking the plausibility of the hierarchically lower-ranking data in the address data block;

emitting a second prompt to the user for correcting the input data in the event the plausibility check corresponding to the lower-ranking data is negative;

correcting the input data corresponding to the hierarchically lower-ranking data by the user via the operating device based on the second prompt.

2. The method according to claim 1, wherein, along with the first prompt to correct the input data, the method signals to the user at which hierarchical level the plausibility check had a negative result.

3. The method according to claim 1, wherein, for the plausibility check, a comparison of the input data is carried out with the comparison data of a databank of the navigation system, and wherein deviations of the input data from the comparison data are marked during the first prompt to correct the input data.

4. The method according to claim 2, wherein, for the plausibility check, a comparison of the input data is carried out with comparison data of a databank of the navigation system, and wherein deviations of the input data from the comparison data are marked during the first prompt to correct the input data.

5. The method according to claim 1, wherein the address data block comprises the following data fields: state, zip code/city, street, and house number or intersection.

6. The method according to claim 5, wherein the state data field is the hierarchically higher-ranking data for which the plausibility check is performed prior to emitting said first prompt to the user for correcting the input data.

7. A method for inputting input data into a vehicle navigation device comprising the acts of:

receiving input data via a receive interface, said input data comprising a hierarchically structured address data block;

performing a first plausibility check on a hierarchically highest-ranking data of the address data block;

emitting a first prompt to a user for correcting said hierarchically highest-ranking data in the event the first plausibility check is negative;

receiving corrected input data from the user corresponding to the hierarchically highest-ranking data;

performing a second plausibility check on a next hierarchically-ranked data of the address data block which is below said hierarchically highest-ranking data;

emitting a second prompt to a user for correcting said next hierarchically-ranked data in the event the second plausibility check is negative; and receiving corrected input data from the user corresponding to the next hierarchically-ranked data.

8. The method according to claim 7, wherein, along with the first and second prompts to correct the input data, the method further comprises signaling to the user at which hierarchical level the plausibility check had a negative result.

9. The method according to claim 7, wherein, for the first and second plausibility checks, a comparison of the input data is carried out with comparison data of a databank of the navigation system, and wherein deviations of the input data from the comparison data are marked during the prompt to correct the input data.

10. The method according to claim 7, wherein the address data block comprises the following data fields: state, zip code/city, street, and house number or intersection.

11. The method according to claim 10, wherein the state data field corresponds to said hierarchically highest-ranking data.

12. The method according to claim 10, wherein the zip code/city field corresponds to the next hierarchically-ranked data of the address data block.

13. The method according to claim 10, wherein the street field corresponds to the next hierarchically-ranked data of the address data block.

14. The method according to claim 7, further comprising permitting the correction of the next hierarchically-ranked data of the address data block only after the hierarchically highest-ranking data has been corrected.

15. The method according to claim 1, wherein the hierarchically higher-ranking data is hierarchically highest-ranked of the address data block.

16. The method according to claim 1, further comprising importing the corrected input data corresponding to the hierarchically lower-ranking data into the vehicle navigation device.

17. The method according to claim 16, wherein, for the plausibility check corresponding to the hierarchically lower-ranking data, a comparison of the input data is carried out with comparison data of a databank of the navigation system, and wherein deviations of the input data from the comparison data are marked during the second prompt to correct the input data.

* * * * *